Patented Feb. 16, 1926.

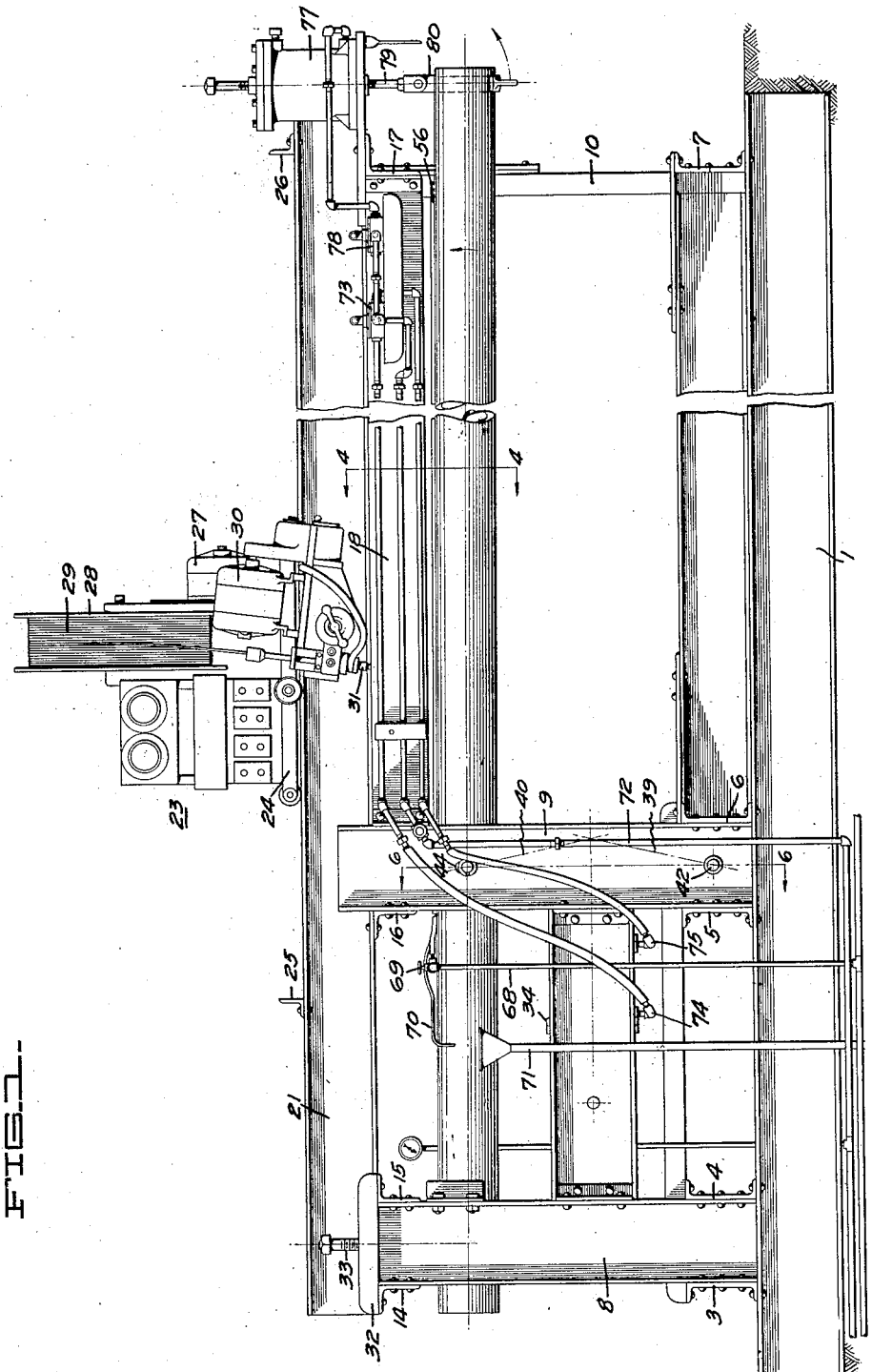

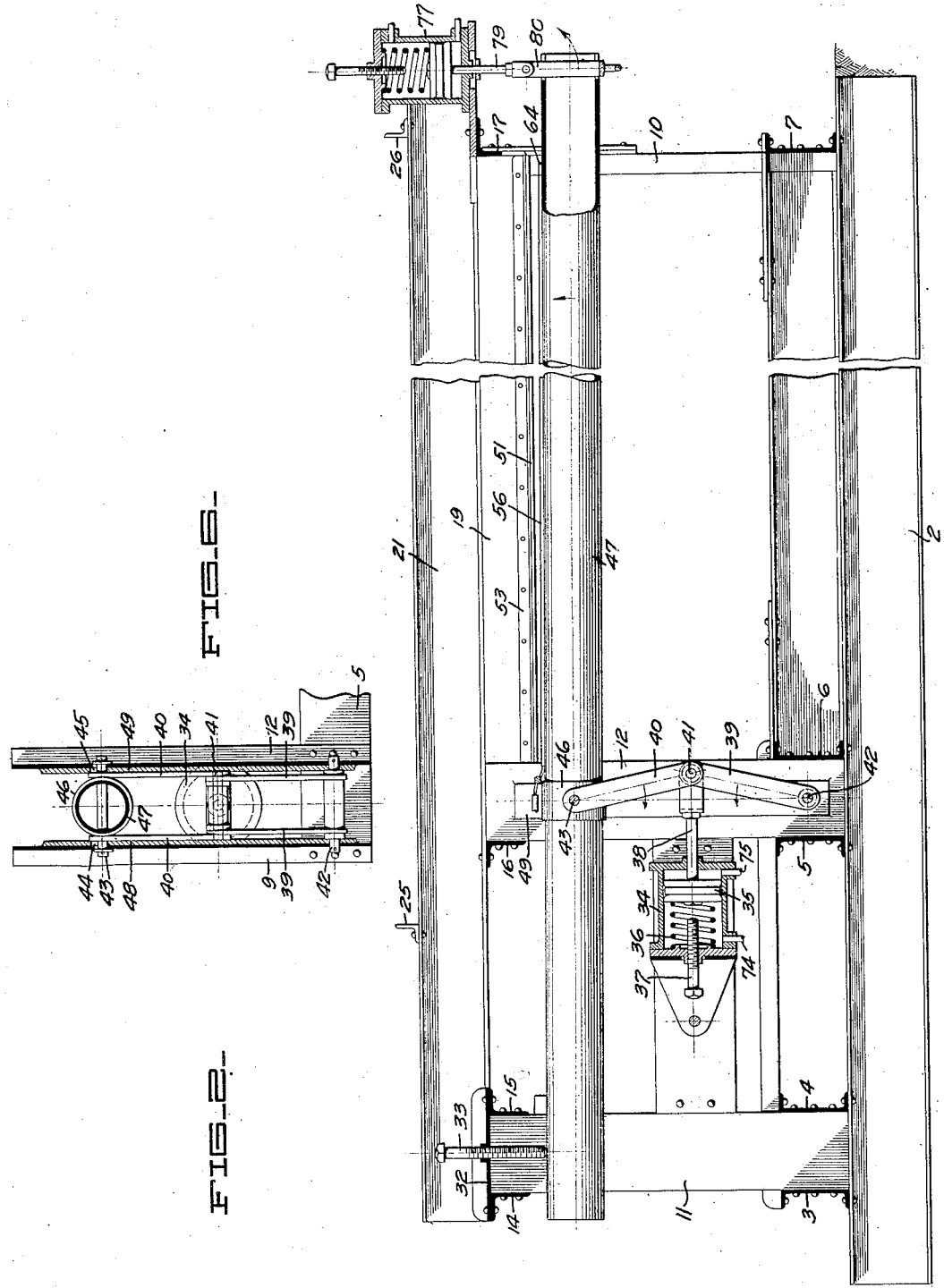

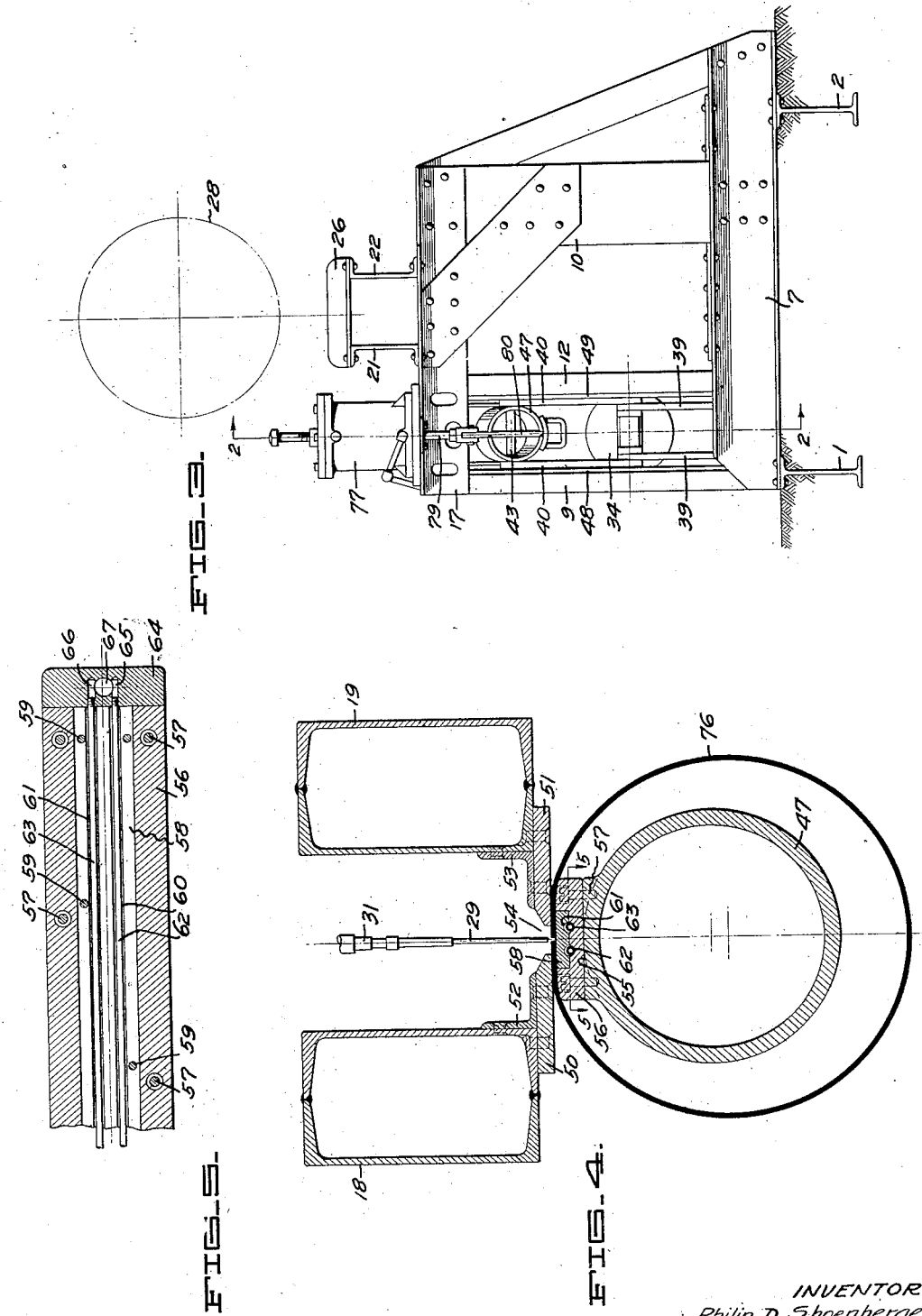

1,573,360

UNITED STATES PATENT OFFICE.

PHILIP D. SHOENBERGER, OF SAN MATEO, CALIFORNIA, ASSIGNOR TO WESTERN PIPE & STEEL COMPANY, OF SAN FRANCISCO, CALIFORNIA, A CORPORATION OF CALIFORNIA.

WELDING APPARATUS.

Application filed July 23, 1925. Serial No. 45,497.

*To all whom it may concern:*

Be it known that I, PHILIP D. SHOENBERGER, a citizen of the United States, and a resident of San Mateo, county of San Mateo, and State of California, have invented a certain new and useful Welding Apparatus, of which the following is a specification.

This invention relates to apparatus for welding tubes and the like and has for its object the provision of improved apparatus of this character which is of simple and rugged construction and functions in an efficient manner. Heretofore it has been the practice to provide a complicated mechanism comprising numerous parts which required numerous adjustments for tightly clamping the edges of the tubes in proper position to be welded, and it is an object of my invention to provide simple apparatus whereby the same result may be readily accomplished. More particularly the invention relates to apparatus in which the movable parts for clamping the edges to be welded in a proper position are reduced to a minimum, which result I accomplish by moving the mandrel which supports the element to be welded into engagement with fixed cooperating parts under suitable pressure thereby clamping the entire element in proper position by a single operation, and eliminating the use of clamps, screws and the like and other adjustments.

The invention possesses other advantageous features some of which with the foregoing will be set forth at length in the following description, where I shall outline in full that form of the invention which I have selected for illustration in the drawings accompanying and forming part of the present specification. In said drawings I have shown one form of device embodying my invention, but it is to be understood that I do not limit myself to such form, since the invention as set forth in the claims may be embodied in a plurality of other forms.

Referring to the drawings:

Figure 1 is a side elevation of apparatus embodying my invention

Figure 2 is a sectional view taken on the line 2—2 of Figure 3.

Figure 3 is an end view of the apparatus shown in Figure 1 as seen from the right.

Figure 4 is a sectional view taken on the line 4—4 of Figure 1,

Figure 5 is a sectional view taken on the line 5—5 of Figure 4 illustrating a part of the cooling means, and Figure 6 is a section taken on the line 6—6 of Fig. 1 illustrating the toggle mechanism for operating the mandrel.

Apparatus embodying my invention is supported on a suitable base which may consist of two longitudinal parallel I-beams 1 and 2, connected by a series of transverse elements 3 to 7 inclusive. These elements or cross-pieces are preferably riveted to the I-beams 1 and 2. Two series of parallel vertical supports 8, 9, 10 and 11, 12 are riveted at their lower ends to said transverse elements as shown, and are connected at their upper ends in a similar manner by transverse elements or angle bars 14 to 17 inclusive as shown. These latter transverse elements support longitudinal hollow beams 18 and 19. The upper cross-pieces 14 to 17 inclusive support longitudinal beams 21 and 22. The several longitudinal, vertical and transverse beams constitute a frame or structure for supporting the operating mechanism comprising my invention. The same has been briefly outlined inasmuch as the applicant does not limit himself to the use of any particular structural arrangement of the frame as the same obviously can assume many forms.

The longitudinal beams 21 and 22 form tracks for a standard automatic welding head 23. Briefly described this unit is mounted on a carriage 24 whose travel on the tracks is limited by stops 25 and 26, and which comprises a motor 27 that drives the carriage, a rod 28 which carries the welding wire 29, a second motor 30 which feeds the welding wire to a head 31 and the necessary electrical connection. Inasmuch as the automatic welding head is a standard well known device, and does not per se constitute a part of the present invention, it is believed that further description thereof is unnecessary.

The parallel vertical supports 8 and 11 are located at one end of the supporting structure described, and support a horizontal flat element 32, which may be riveted to the transverse angle bars 14 and 15 as best shown in Figure 2. Preferably at a point midway between the vertical supports 8 and 11 the horizontal element 32 is provided with a screw 33 which extends thru the same. The parallel vertical supports 9 and 12 are spaced a suitable distance from the supports 8 and 11 and between them is supported a cylinder 34, having a piston 35 acting against a spring 36 and a screw 37 extends into the cylinder 34 to limit the travel of the piston in one direction. The piston 35 on the side opposite the spring 36 is connected by means of a stem 38 with a toggle comprising a pair of links 39 and 40, which are pivoted at one end on a shaft 41. The lower pair of links 39 is pivoted at their opposite ends on a shaft 42 journaled in the vertical supports 9 and 12 and the upper pair of links 40 is pivoted at their opposite ends on a shaft 43 which is supported in longitudinal slots 44 and 45 in vertical supports 9 and 12 respectively as best shown in Fig. 6. A ring 46 is closely fitted over a mandrel 47 and tightly holds the same, and the shaft 43 extends through said ring and mandrel. Metallic pads or guides 48 and 49 are provided on the inner sides of the vertical supports 9 and 12 respectively to prevent lateral movement of the toggle mechanism described.

The longitudinal hollow beams 18 and 19 extend from the vertical supports 9 and 12 to a point opposite the vertical support 10 at the end of the structure, and are respectively provided with parallel plates 50 and 51 as best shown in Fig. 4. The plates 50 and 51 are preferably secured thereto by means of angle bars 52 and 53 respectively and extend inwardly toward each other so as to leave a longitudinal space 54 between the same over which the welding head 31 travels, and between which the welding wire is positioned in operation. The space 54 is parallel with the longitudinal axis of the mandrel 47 in a vertical plane. The mandrel 47 is formed with a flat horizontal surface 55 positioned above its axis which extends from the portion of the mandrel engaged by the ring 46 toward the right as viewed in Fig. 1 preferably a distance corresponding to the lengths of plates 50 and 51. A flat plate 56 is suitably secured to the surface 55, such as by screws 57, and the top side of the plate 56 is grooved to receive a copper plate 58, which is secured thereto by screws 59. The copper plate 58 is positioned to bridge the space 54. Parallel channels 60 and 61 are provided between the copper plate 58 and the plate 56 to accommodate water pipes 62 and 63 for cooling the copper plate. At one of their ends, the pipes 62 and 63 are preferably connected by means of an end piece 64 which has two holes drilled therein 65 and 66 adapted to receive the ends of the pipes, and which holes are connected by a third hole 67 drilled at right angles thereto, and afterwards plugged, as shown in Fig. 5. The opposite end of pipe 62 is connected with a suitable source of water supply 68, controlled by a valve 69 and the opposite end of pipe 63 is connected with a suitable outlet 70 leading to a drain 71, whereby water may freely circulate through the pipes 62 and 63 in a manner readily understood and cool the copper plate 58.

The piston 35 is actuated from a suitable source of compressed air or other fluid pressure 72, which is connected with a suitable valve 73, preferably supported on the beam 18. The valve 73 is connected with the opposite ends of the cylinder 34 by means of suitable communicating passages 74 and 75.

From the foregoing it will be seen that when air is admitted to the cylinder 34 through the passage 75, the piston 35 moves to the left as seen in Fig. 2 and extends the toggle mechanism vertically thereby raising the mandrel 47, the screw 33 acting as a fulcrum, which may be adjusted. The mandrel is forced upwardly into close engagement with the plates 50 and 51. In operation, a tube 76 to be welded is slipped over the free end of the mandrel, with the edges or open ends on top of the copper plate 58, and in a position corresponding to a point midway between the plates 50 and 51. The upper surface of plate 56 is preferably rounded at its edges to receive the tube 76. The piston 35 is then actuated as above described whereby the mandrel is raised and the tube 76 tightly clamped between the plate 56 and the plates 50 and 51. The slots 44 and 45 permit the mandrel to align itself horizontally thereby tightly clamping the tube its entire length. After the tube 76 is so clamped in position, the edges are welded together in the usual manner.

If desired, a second cylinder 77, similar to cylinder 34, may be provided positioned near the free end of mandrel 47, controlled by a valve 78 and also connected with the air source 75. The piston of the same is connected by means of a stem 79 with an arm 80, pivoted thereto, adapted to engage a slot in the free end of the mandrel 47, whereby after the mandrel has been positioned as above described, it may be further tightened. This additional clamping means however has not been found necessary in usual practice.

I claim:

1. Welding apparatus comprising an automatic welding head, a supporting structure having fixed spaced elements between which said head operates, a pivoted mandrel for supporting a tube to be welded and means for actuating said mandrel so as to clamp the tube supported thereon between it and said horizontal elements.

2. Welding apparatus comprising a supporting structure, an automatic welding head, fixed spaced horizontal elements between which said head operates, a mandrel positioned below said elements and pivoted on a horizontal axis and means for actuating said mandrel so as to move it into close engagement with said horizontal elements.

3. Welding apparatus comprising a supporting structure, an automatic welding head, fixed spaced horizontal elements between which said head operates, a mandrel positioned below said elements, and means for moving said mandrel into close engagement with said elements comprising toggle mechanism connected with said mandrel at an intermediate point, and means on said structure acting as a fulcrum on one end of said mandrel.

4. Welding apparatus comprising a supporting structure, an automatic welding head, parallel elements on said structure between which said head operates, a mandrel below said elements positioned parallel with and in a vertical plane midway between the same, means pivotally supporting said mandrel at an intermediate point, means on said structure acting as a fulcrum on one end of said mandrel and means for causing said mandrel closely to engage with said elements.

5. Welding apparatus comprising a supporting structure, an automatic welding head, parallel elements on said structure between which said welding head operates, a mandrel below said elements positioned parallel with and in a vertical plane midway between the same for supporting a tubular element to be welded, toggle mechanism pivotally supporting said mandrel at an intermediate point, means on said structure acting as a fulcrum on one end of said mandrel and means for actuating said toggle mechanism whereby said mandrel is caused to tightly clamp a tube thereon between itself and said parallel elements.

6. Welding apparatus comprising a supporting structure, an automatic welding head, fixed parallel elements between which said head operates, a mandrel positioned below said elements and means for moving said mandrel into engagement with said elements comprising a fluid pressure cylinder, toggle links connected with the piston thereof, the lower of said links being pivotally connected with said structure and the upper of said links being pivotally connected with said mandrel at an intermediate point, and means on said structure acting on one end of said mandrel as a fulcrum.

7. Welding apparatus comprising a supporting structure, an automatic welding head, fixed parallel elements between which said head operates, a mandrel positioned below said elements and means for moving said mandrel into engagement with said elements comprising a ring formed element fixed on said mandrel at an intermediate point, trunnions on said ring formed element, a fluid pressure cylinder, toggle mechanism connected with the piston of said cylinder comprising upper and lower links, said upper links being pivotally connected with said trunnions and said lower links being pivotally connected with said structure, and means on said structure acting on one end of said mandrel as a fulcrum.

8. Welding apparatus comprising a supporting structure, an automatic welding head, fixed parallel elements between which said head operates, a mandrel positioned below said elements and means for moving said mandrel into engagement with said elements comprising a ring formed element fixed on said mandrel at an intermediate point, trunnions on said ring formed element, a fluid pressure cylinder, toggle mechanism connected with the piston of said cylinder comprising upper and lower links, said upper links having elongated openings in which said trunnions are pivotally supported and said lower links being pivotally connected with said structure, and means on said structure acting on one end of said mandrel as a fulcrum.

9. Welding apparatus comprising an automatic welding head, a supporting structure, parallel elements on said structure between which said head operates, a mandrel pivotally supported below said elements having a longitudinal copper element adapted to bridge said parallel elements when said mandrel engages the same and means for moving said mandrel against said parallel elements.

10. Welding apparatus comprising an automatic welding head, a supporting structure, spaced longitudinal elements on said structure between which said head operates, a mandrel pivotally supported below said elements, and means for moving said mandrel against said longitudinal elements, said mandrel having a copper element adapted to bridge said longitudinal elements when in contact therewith, and means for cooling said copper element.

11. Welding apparatus comprising an automatic welding head, a supporting structure, spaced longitudinal elements on said structure between which said head operates, a mandrel pivotally supported below said elements formed with a flat surface facing said elements, a centrally grooved member secured to said surface, a flat copper element secured within said groove, and means for moving said mandrel into engagement with said longitudinal elements.

12. Welding apparatus comprising an automatic welding head, a supporting structure, spaced longitudinal elements on said structure between which said head operates, a mandrel pivotally supported below said elements formed with a flat surface facing said elements, a centrally grooved member secured to said surface, a flat copper element secured within said groove, cooling means between said grooved member and said copper element, and means for moving said mandrel into engagement with said longitudinal elements.

13. Welding apparatus comprising an automatic welding head, a supporting structure, spaced longitudinal elements on said structure between which said head operates, a mandrel pivotally supported below said elements formed with a flat surface facing said elements, a centrally grooved member secured to said surface, a flat copper element secured within said groove, means for circulating water between said grooved member and said copper element, and means for moving said mandrel into engagement with said longitudinal elements.

In testimony whereof, I have hereunto set my hand.

PHILIP D. SHOENBERGER.